United States Patent [19]

Madsen et al.

[11] Patent Number: 4,636,419
[45] Date of Patent: Jan. 13, 1987

[54] NET AND METHOD OF PRODUCING SAME

[75] Inventors: Willy B. Madsen; Finn H. Jensen, both of Copenhague Valby; Ole B. Rasmussen, Birkerod, all of Denmark; Guy Goldstein, Colmar; Yves R. Russin-Moynier, Wettolsheim, both of France

[73] Assignee: Beghin-Say International, Inc., Lakeland, Fla.

[21] Appl. No.: 821,079

[22] Filed: Aug. 2, 1977

Related U.S. Application Data

[63] Continuation of Ser. No. 388,124, Aug. 13, 1973, abandoned.

[51] Int. Cl.⁴ ............................................. B32B 3/10
[52] U.S. Cl. .............................. 428/131; 156/244.18; 156/244.22; 156/494; 428/107; 428/113; 428/134; 428/135; 428/137; 428/296

[58] Field of Search ............... 428/172, 286, 287, 288, 428/137, 131, 134, 135, 136, 910, 107, 113, 296; 156/224, 166, 167, 244; 264/176 F, 177 F, 288, 289, 290 R, 290 N, 290 T, DIG. 26, DIG. 47, DIG. 73, DIG. 87

[56] References Cited

U.S. PATENT DOCUMENTS 3,832,256  8/1974  Kalwaites .......................... 156/212

Primary Examiner—Marion E. McCamish
Attorney, Agent, or Firm—A. W. Breiner

[57] ABSTRACT

The invention relates to a net composed of a regular array of longitudinal ribbon-formed continuous filaments of a polymer substance, and a regular array of transverse stems of different polymer matter, said filaments being embedded in said stems, as well as to a process of producing such net from a sheet consisting of a regular array of longitudinal ribbon-like polymer filaments embedded in a polymer matrix, the filament polymer having a higher melting point than the matrix polymer, by transversely impressing said sheet at a temperature where siad matrix is at least semi-molten and the filaments are solid, then splitting the structure.

15 Claims, 11 Drawing Figures

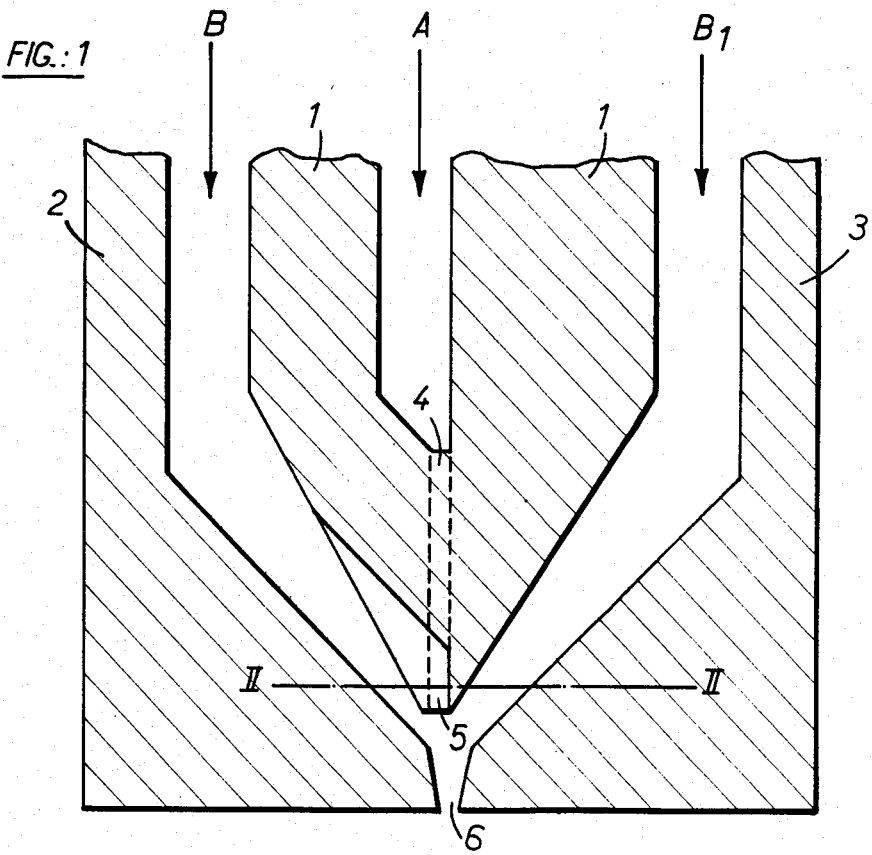
FIG.:1
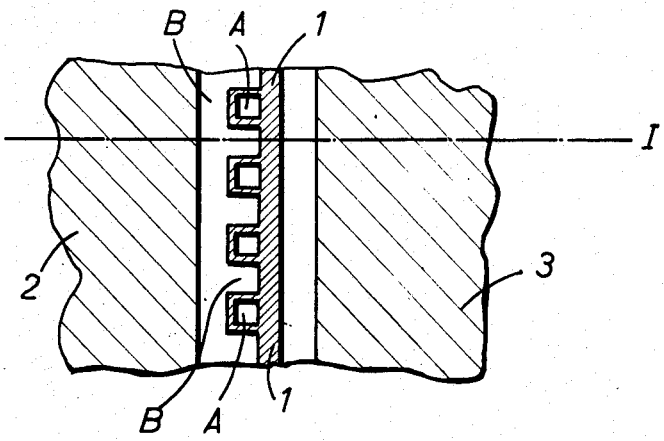
FIG.:2

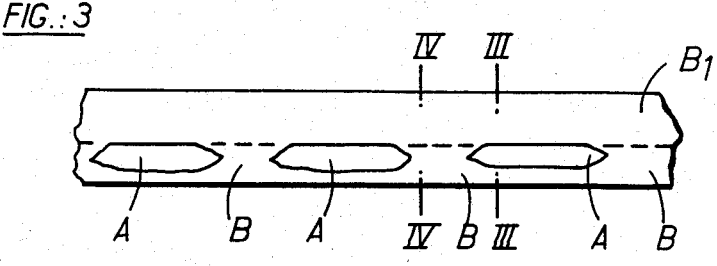
FIG.:3
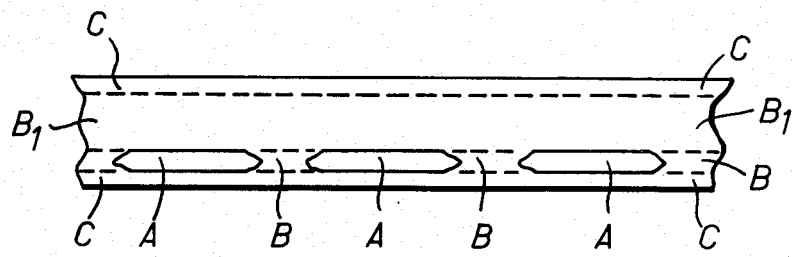
FIG.:6
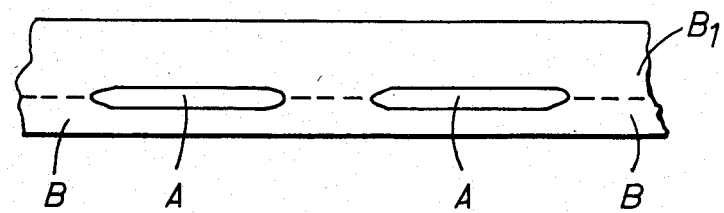
FIG.7

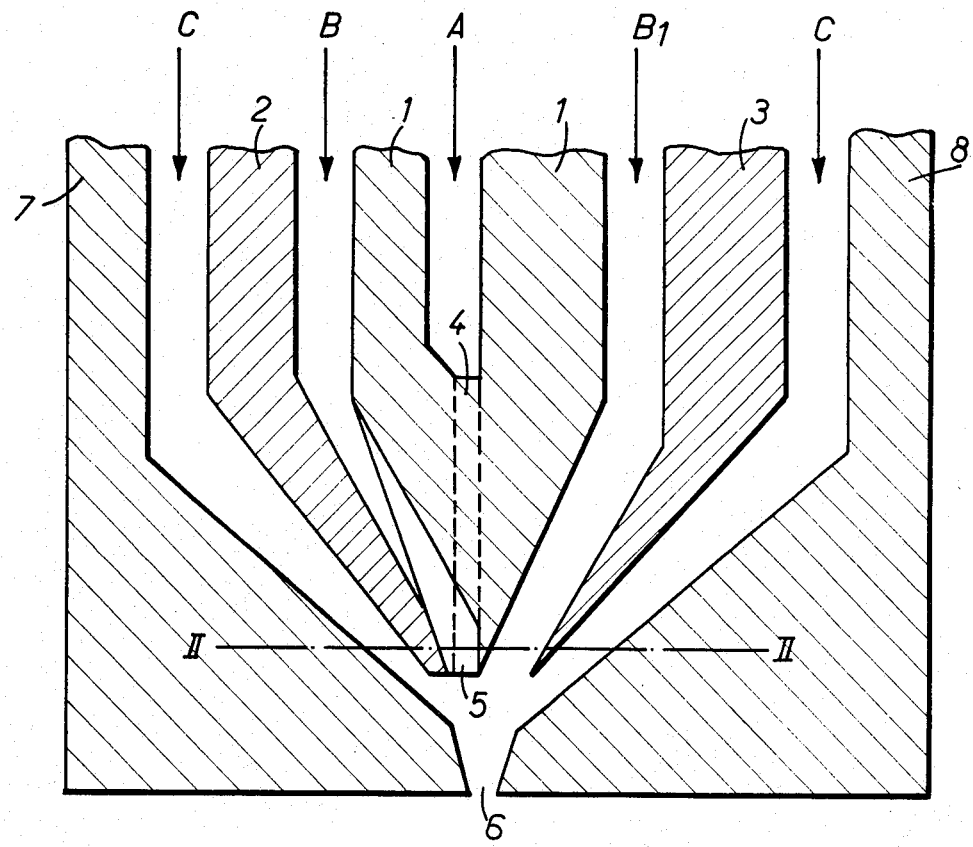
FIG.: 4
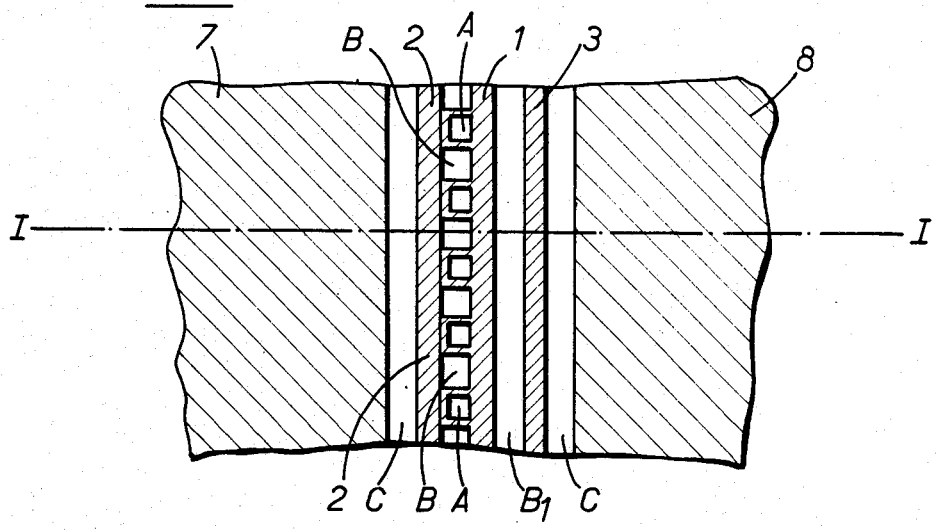
FIG.: 5

FIG.:10

NET AND METHOD OF PRODUCING SAME

This is a continuation of application Ser. No. 388,124 filed Aug. 13, 1973, now abandoned.

The present invention relates to a net and a method of producing same. In more particular the invention relates to a net derived from a film or sheet.

Nets either derived from film or formed directly at the exit of an extrusion die are at present mainly used as reinforcement in paper articles or cheap textiles, e.g. in sanitary paper articles, paper cloth and heavy duty bags, and non-woven upholstery fabrics. They are further used, or have been suggested for use as window curtains, decorative net, wrapping material, mosquito net, protective gardening nets against insects or birds, backing for growing of grass or plants, sport nets, light fishing nets, and filter materials.

The nets formed directly at the exit of an extrusion die have the drawbacks or limitations that the mesh is relatively big, that orientation of the cross-points is difficult, and that the nets can generally not be made finer than about 20 grams per sq.m.

One type of net derived from film consists of two or more cross-laminated layers of uniaxially oriented film which have each been fibrillated to net form. This involves the need for a lamination process after fibrillation and at this stage lamination is generally complicated. For reinforcement in sanitary paper a fineness of 5 grams per sq.m. or finer is usually needed, and it is practically impossible to obtain this when two layers have to be laminated after fibrillation.

In a modification of this type of net, lamination can be avoided, as reinforcement filaments of a non-splitting polymer is incorporated in the splitable film, which is oriented at an angle to the incorporated filaments and then fibrillated at random. However, the randomness of the mesh is usually a drawback, and the randomly fibrillated material is relatively weak, as special admixtures are used to facilitate the random fibrillation.

Another type of nets derived from film is formed by slitting a pattern of intermittent lines, which are mutually staggered, and expanding the slit film while stretching biaxially. This process produces nets of a big mesh and with weak cross-points.

A third type of net derived from film is formed by embossment of the film in a suitable pattern followed by biaxial stretching under conditions which fibrillate the thin areas of the film at the same time as the material is expanded. Dependent on the pattern of the embossment different properties can be obtained, but the net is generally weak as the bosses remain unoriented.

A fourth type also makes use of embossment, but the bosses are formed as transverse stems which are subsequently oriented and form the main direction of strength. The thin, lineary areas of the embossed film are oriented and split generally in the longitudinal direction and form relatively weak bridges between the transverse stems. For most uses this net has to be cross-laminated with another net or web, and this again involves the limitation that it is very difficult to produce the very low sq.m. weights required for reinforcement in sanitary articles.

Finally, it is known that net structures can be produced by extruding alternate streams of different polymers, joining the streams in the extrusion die, which contains moving parts that turn the streams to a transverse direction at the same time as they draw the streams to thin structures named "lamellae". Still in the die, one or both boundaries of the fluid sheet pass over a comb which drag longitudinal "tentacles" from the edges of the lamellae and collect the tentacles in bundles. After solidification, the sheet is mechanically disrupted in accordance with the layered and fibrous structure produced in the die, and hereby a fabric is achieved with two interconnected thread directions. However, the fabrics produced by this method are several times heavier than the abovementioned usual requirements for nets in sanitary articles.

We have now invented an entirely new technique, generally speaking by a combination of side-by-side extrusion of streams, and transversal embossment, and splitting. We have hereby obtained a particularly fast and reliable process whereby the desirable weight of about 5 grams per sq.m. or lower can be achieved without difficulty. Further there is provided a novel and advantageous structure.

The net according to the present invention is composed of a regular array of longitudinal ribbon-formed continuous filaments of a polymer substance, and a regular array of transverse stems or strands of different polymer matter, said filaments being embedded in said stems.

Hereby is achieved a net structure which comes very close to a woven structure and consequently has similar good properties.

Interesting effects are obtained by using different polymer substances in the two directions.

In order to facilitate the embodiment of the filaments in the transverse strands or stems, without causing damage to the filaments, the latter should preferably be formed of a polymer substance with higher melting point than the polymer matter of which the stems are formed. Due to the ribbon-form of the filaments the embedment produce only a small notch-effect in the stems.

In order to further reduce this notch effect, the ribbon-formed filaments are preferably tapered at their edges.

In a preferred embodiment of the net according to the invention said filaments are embedded in slipping relation with their embedment. During the production of the net, this is easily obtained when the filaments and the stems (or at least those portions of the stems which contact the filaments) are formed of incompatible polymer substances. By this slipping relationship the diagonal flexibility is increased, and further the orienting at the cross-points is facilitated.

The filaments are preferably oriented, and the stems are preferably also oriented.

In another embodiment of the net according to the invention the stems have ribbonlike branches integral therewith, said branches forming part of the embedment for said filaments and the total thickness of each branch being thinner than the corresponding stem. In the oriented stem the cavities in which the filaments are embedded are, of course, also elongated. The branches, however, serve to prevent an exaggerated movement of the filaments within the elongated cavities in the stems.

These branches may with advantage connect each set of adjacent stems.

In another embodiment of the net according to the present invention the stems are formed of several layers of different polymer substances. Such layered arrangement can easily be formed in connection with the embedment, as it will be described later, and important effects can be obtained in this manner.

Thus, when the net is used for reinforcement in sheets of cellulosic fibres, at least one surface layer of each stem can with advantage be formed of olefin copolymer capable of producing an adhesive bond with cellulose, e.g. ethylene-acrylic acid copolymer, ethylene-methacrylic acid copolymer, or an ionomer, while the main portion of the stems is formed of essentially homopolymer olefin. the latter is used on account of its low price and relatively high strength.

As mentioned above, the filaments should preferably be formed of a polymer substance with higher melting point than the polymer matter of which the stems are formed, and a suitable choice is that said filaments are formed of polyamid, e.g. Nylon 6 or Nylon 66, or of polyethyleneterephthalate, and said stems are formed of polyolefin.

While the longitudinal filaments must always be ribbon-formed to avoid a notch effect in the transverse stems, the latter may have different forms. Thus, if relatively high stiffnes is desirable, e.g. to obtain a suitable drape effect of light weight fabrics, the stems are preferably of generally circular to squared shape.

If, on the other hand, high softness is desirable, e.g. in sanitary articles such as surface netting on napkins, the stems are preferably of pronouncedly flat shape.

As mentioned above, important effects can be obtained by forming the stems in a layered structure of different polymers. One application of such a layered structure has been described. It can further be used to obtain a bulky net, and for this purpose said layers are in a state of differential shrinkage forming a curling of the stem. In this case the filaments should preferably be considerably spaced apart from one another.

The invention also comprises a method for producing the net described above, comprising the steps of forming a film or sheet consisting of a regular array of continuous, longitudinal, ribbonformed filaments of a higher melting polymer substance (A) which are spaced apart from one another and which are each embedded in a matrix of lower melting polymer matter, subsequently impressing said film or sheet according to a linear, transverse pattern at a temperature at which the matrix is molten to semimolten, and (A) is pronouncedly more solid, and at a pressure adapted to collect at least the main portion of said lower melting polymer matter in a regular pattern of transverse stems, but leaving said filaments substantially undamaged, and subjecting the lower melting polymer matter to splitting between the filaments of (A) in said impressed areas.

When compared with other methods in which a film is impressed as a basis for splitting to a net structure, the method according to the present invention has higher efficiency due to the conveying action of the relatively solid longitudinal filaments.

A more vigorous impression action is therefore allowable, whch means that higher process velocities can be achieved and that the accuracy of the apparatus and the adjustment of process conditions are less critical. As it will be further described below, it is even possible to combine the impression and the fibrillation to one step.

In an embodiment of the method according to the present invention at least those portions of said matrix which are brought in direct contact with (A) by said embedment consist of polymer substance(s) which are incompatible with (A). The filaments and the stems will hereby form a slipping type of join with each other with advantages which have been described above.

The embedding of the filaments in the matrix can be carried out in many different ways, however, the most expedient procedure found is to produce said embedding by extruding an intermediary layer formed of streams of (A) interspersed with another polymer substance (B), the streams of (B) being part of the matrix, and forming the rest of the matrix by coextruding on either side of said intermediary layer surface layers of (B) and/or of other polymer substance(s).

An embodiment of the invention is further characterized in that at least one of the surface layers is formed integral with said interspersed streams of (B) preferably by means of a profiled orifice for (B). This is a particularly simple way of producing the embedded arrangement. Instead of by use of such profiled die, the integral formation of a surface layer can also be achieved by merging the streams of (B) beyond one side of each stream of (A), e.g. by extruding the streams of (A) and of (B) into a common chamber, while the extrusion orifices for (B) fill a greater part of the chamber width than the extrusion orifices for (A).

In another embodiment of the invention, still based on the described interspersed coextrusion of (A) and (B), at least one of the surface layers is formed of a distinct stream extruded independently of said interspersed streams of (B). This allows for variations of the layer thicknesses and the spacing-apart of the filaments, these variations being independent of each other.

Usually there is no particular advantage in placing the filaments right in the middle of the matrix or varying both surface thicknesses, and consequently the above features can with advantage be combined by forming a major surface layer of a distinct stream extruded independently of said interspersed streams of (B), while the opposite, minor surface layer is formed integral with said interspersed streams of (B). Suitable relative values of layer thicknesses are indicated later in this description.

In order to obtain high longitudinal strength it is preferable to intersperse only small amounts of (B) with the streams of (A) in the intermediary layer. E.g. the filaments should occupy about ⅔ or more of the intermediary layer.

With a view to the adhesion to cellulose fibres and the economical advantages of using polyolefins, an embodiment of the invention is characterized in that a major surface layer is formed of essentially homopolymer olefin and a minor surface layer is formed of an olefin copolymer capable of producing an adhesive bond with cellulose, e.g. ethylene-acrylic or ethylene methacrylic acid copolymer or an ionomer.

As regards a suitable choice of polymer for the filaments in relation to the choice of polymer for the matrix, hereunder considering differences in melting point and economical features, an embodiment of the invention is characterized in that (A) consists of polyamide, e.g. Nylon 6 or 66, or of polyethyleneterephthalate, and the matrix consists, at least in essence, of polyolefin(s).

The impression according to a transverse lineary pattern needs not be perpendicular, or nearly perpendicular, to the machine direction, but if the net is intended for use in lamination it may be carried out under a pronouncedly acute angle, e.g. 45°.

Well-known procedures of impression may be applied, hereunder the use of an embossed roller, and as counter part a smooth roller. The application of a vibrating edge and a flat or cylindrical anvil has also been suggested and can be used in connection with this invention. In any case, it is preferable to take advantage of the conveying action of the relatively solid filaments and therefore to produce an effect more vigorous than otherwise possible.

Thus, a preferred embodiment of the invention is characterized in that said impression is carried out by means of an embossed preferably hard roller engaged with a smooth preferably hard roller, the two rollers carrying the film (sheet) in the same direction, but being rotated at different circumferential velocities, so as to increase the impression effect by means of shearing, the smooth roller being preferably the faster one.

When carrying out this procedure of impressing, it is preferred to feed the film (sheet) onto the smooth roller which is kept at a temperature adapted to bring the polymer substances in the aforesaid states for impression, while the embossed roller is kept at a lower temperature to avoid the material from sticking thereto.

A substantial simplification can be achieved by carrying out said shearing action to an extent sufficient to produce said splitting simultaneously. This effect is based on a great difference in resistance to the disruptive effect of the pressure and shear between those areas which are directly conveyed by the filaments and those which are not.

Whenever the assembly of an embossed roller and a smooth counter-roller is used in connection with the present invention, the best conveying action of the filaments is obtained when using a film or sheet having the filaments of (A) embedded closer to one surface than to the other surface, and in which the surface closest to the filaments is brought in contact with the embossed roller.

Both the longitudinal ribbons and the transverse bosses are preferably oriented by stretching. For the sake of regularity of the structure the longitudinal filaments of (A) are preferably oriented subsequently to co-extrusion and prior to impression. However, it is usually also advantageous to finalize the orientation of said filaments subsequently to the impression. Hereby the weight per sq.m. is reduced, and the spacing between the stems is increased. This increase is often required as the best impression appears to be obtained with a division not more than about 1 to 2 mm between the bosses or teeth of the roller.

When the stems are oriented, as usually required (except if they are made of elastomeric material) this orientation is carried out subsequently to the impression by cross-stretching preferably by means of a tenterframe.

The cross-stretching is usually carried out at a ratio between 5 and 10:1 and hererby the longitudinal ribbons are spread apart accordingly. The ribbons should therefore normally be extruded with a division as small as practically possible, e.g. about 1 mm, but a still smaller division may be desirable. An expedient way to obtain a close arrangment of the longitudinal filaments of (A) is achieved by stretching the film (sheet) subsequently to the co-extrusion and prior to the impression while allowing cross-wise contraction of the film (sheet). This stretching may be the same as the above-mentioned orientation, but may also fully or partly be carried out while the filaments are molten or semimolten, whereby they will not become substantially oriented.

The embossment will normally produce stems of generally circular to square shape. This should be understood as a very approximate indication. When—in order to produce a softer handle—flat stems are desirable, the stems can be flattened by calendering subsequently to the impression and preferably prior to the cross-stretching. This calendering may be carried out at an elevated temperature.

As mentioned, the conveying effect of the longitudinal filaments highly facilitates the step of impressing the film (sheet), in particular when the surface layer adjacent to the embossed roller is thin and when only small amounts of (B) are interspersed between the filaments. However, a still higher conveying effect and thereby still higher production rates can be obtained when the polymer substance interspersed with (A) and a polymer substance forming a minor surface layer are blends containing relatively small portions of an incompatible polymer having higher melting point, whereas the major surface layer is formed of a substantially homogenous polymer substance, longitudinal fibrillation of said blended component(s) being carried out subsequently to the impression in the impressed areas. In this connection said blended component(s) can with advantage consist for the major part of polyolefin, the admixture being polyamide or polyethyleneterephthalate in a percentage about or below 25%.

The abovementioned fibrillation of the blended component(s) will usually occur sufficiently simply by the cross-stretching step by which the stems are oriented. In similar way other types of impressed film or sheet material according to the invention, when not split during the impression, can often be split to the desired net form by cross-stretching alone. However, splitting (fibrillation) can also be carried out as an independent step between the impression and the stretching of the stems. A convenient way to obtain this is to carry out the impression in a pattern at bias, e.g. about 60° to 75° to the machine direction and to deflect the sheet so that the angle between the filaments and the stems is increased, preferably to about 90°.

As regards the embedment of the longitudinal, ribbon-formed filaments in the matrix, in the foregoing the emphasis has been put on the coextrusion process where different polymer substances are interspersed with one another and surface layers are formed in the same extrusion die. Although this has been found to be a particularly suitable process, there are also other ways to form said embedded arrangement. Thus a film (sheet) of interspersed streams can be formed in a first process step, while the surface layers are extruded or calendered hereon by a separate process step.

As a third way of forming the embedded arrangement, the longitudinal ribbonformed filaments can be produced and arranged as an array by slitting and drawing of a film, and the matrix can thereafter be applied to both sides of the array and joined between the ribbons in a calender. Instead of by slitting of a film, the filaments can also be formed by ordinary extrusion from a row of orifices.

Finally, as regards apparatus required, a particularly simple way of forming the embedded arrangement yielding, however, a somewhat lower strength in the final product, is by forming an ordinary film (sheet) of 3 or more layers with the substance (A) as an interior layer, and the matrix substance(s) on either side of this layer. Subsequently this composite film (sheet) is slit to an array of ribbons which are normally drawn, and thereafter the matrix substance(s) are squeezed from either surface of the ribbons and joined in the spaces between the ribbons. This squeezing can be carried out simultaneously with the formation of the stems by the above-described impression, or there can preferably be a prior calendering at a suitable temperature.

The invention will now be described in more detail with reference to the drawings of which FIG. 1 is a cross-secton (through I—I of FIG. 2) of an extrusion die for the carrying out of the invention;

FIG. 2 is a longitudinal section (through II—II of FIG. 1) of the same die;

FIG. 3 is a cross-section of the structure of a film which is an intermediate product in the production of the net according to the invention, and is produced by the die shown in FIGS. 1 and 2;

Figure 8:
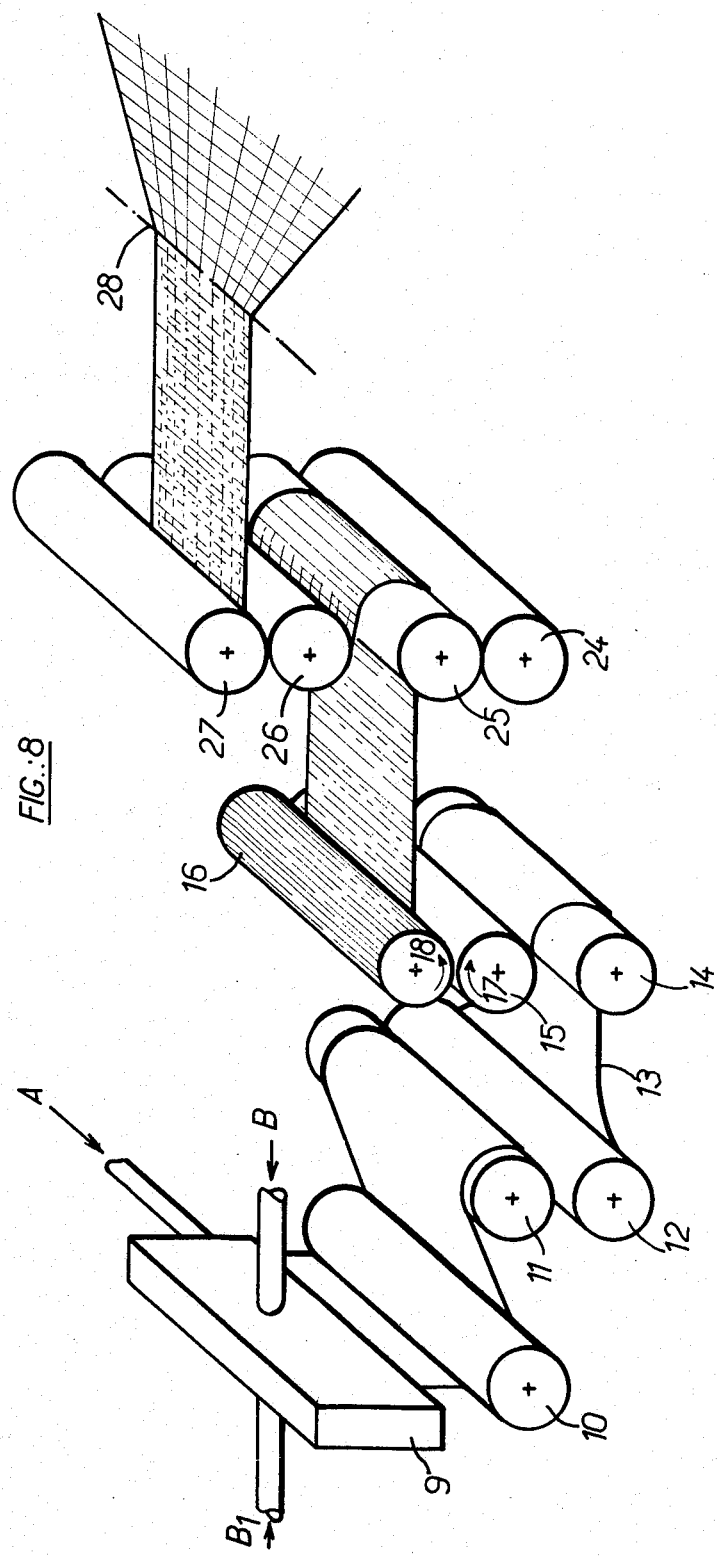
Figure 9:
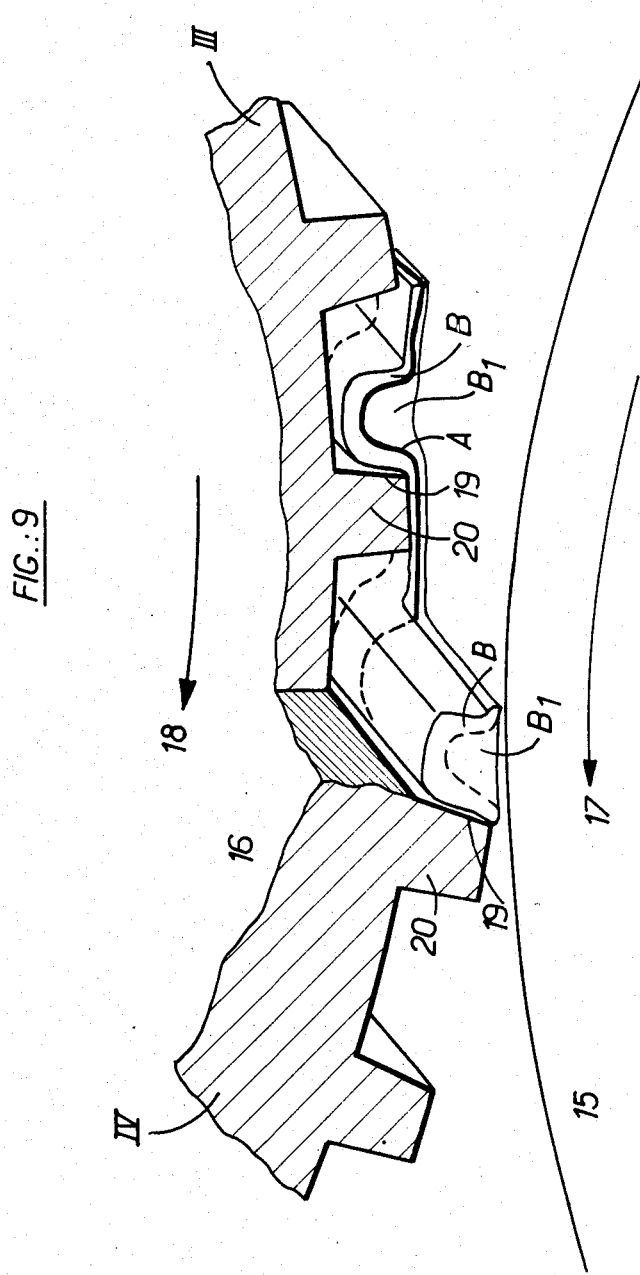
Figure 10:
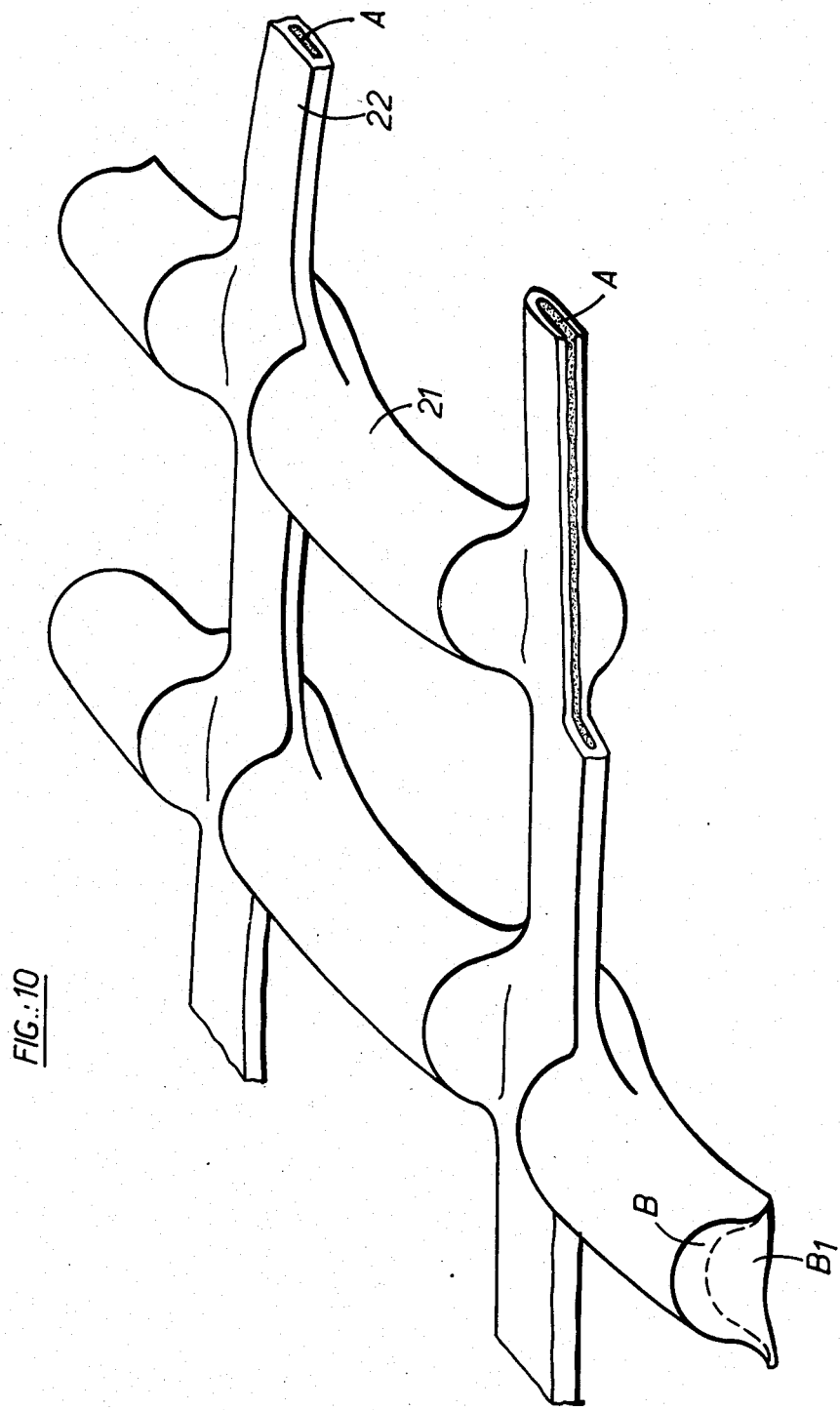
Figure 11:
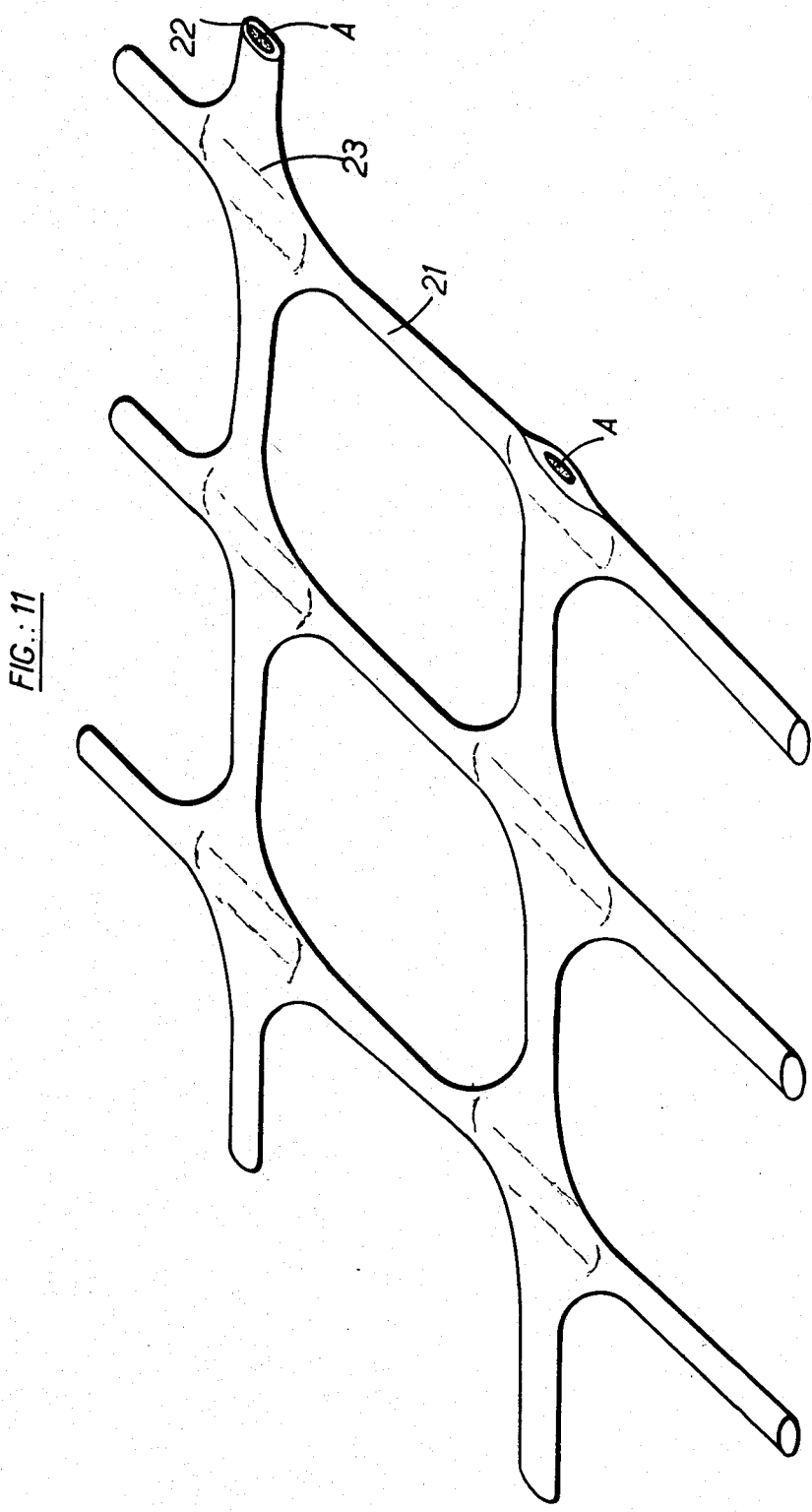

FIGS. 4 and 5 which correspond to FIGS. 1 and 2, respectively, show a modification of the die;

FIG. 6 which corresponds to FIG. 3 shows the film structure produced by the die of FIGS. 4 and 5;

FIG. 7 which also corresponds to FIG. 3 shows another modification of the film structure;

FIG. 8 is a schematical, perspective view of a total line to produce the net of the invention, except that the cross-stretching (the last step) is not shown;

FIG. 9 is a representation of the impression process, showing the film and the embossed roller in perspective view with displaced view section, III corresponding to III—III of FIG. 3, and IV corresponding to IV—IV of FIG. 3;

FIG. 10 is an enlarged, perspective view, with partial sections of the net of the invention, before the final longitudinal stretching and before any cross-stretching has taken place;

FIG. 11 is a similar view as 10, but on a less enlarged scale, of the net after final longitudinal stretching and after cross-stretching.

In FIGS. 1 and 2 a higher melting polymer substance A and two lower melting polymer substances B and $B_1$ are extruded from separate extruders and distribution channels (not shown) into three slot-formed conduits as shown by the three arrows.

B and $B_1$ can be identically the same polymer substances, but still fed independently, or different modifications of the same polymer, or two polymers which are chemically different, but capable of forming a strong adhesive bond with each other. A is preferably incompatible with B and $B_1$.

The die is formed of an internal part (1) and two external parts (2) and (3). The slot-formed conduit for A is divided into a big number of parallel channels at zone (4) in this part. As it appears particularly from FIG. 2, part 1 ends in a comb-formed profile, and the channels for A pass through each "tooth" of the "comb". In the chamber 5, A, B and $B_1$ join to a composite sheet. A is extruded into this chamber from a row of separate orifices, while B is extruded from a comb-formed orifice and $B_1$ is extruded from a straight slot. Hereby the structure of FIG. 3 is formed, except that the streams (filaments) of A are not yet ribbonformed.

The composite stream is narrowed and extruded through the exit slot (6), and thereafter the fluid sheet is drawn down, whereby the filaments of A become ribbonformed. The relative layer thicknesses and the proportion between the width and the spacing-apart of the ribbonformed filaments are determined by the relative extrusion through-puts and by the relative dimensions in the tooth-formed orifice for B.

Due to smearing-out the ribbonformed filaments have a tendency to become tapered at the edges, as shown.

This form is advantageous and can be promoted by a suitable shaping of the channels for A.

In FIGS. 4 and 5 and the representation of the structure of FIG. 6, the die has been modified to form two surface layers of a third polymer substance C, applied form a third extruder. C can e.g. be a polymer capable of forming a bond with cellulose. In the film C must form a strong adhesive bond with B and $B_1$, but not necessarily with A. Consequently, there is no need to cover one of the surfaces of the ribbonformed filaments with B, but B is only interspersed with A as a big number of separate streams.

To achieve this, B is extruded into the common chamber (5) from a row of orifices interspersed with the orifices for A instead of being extruded from a comb-formed orifice.

On the other hand it can also be advantageous to intersperse both component B and component $B_1$ between the streams of A so to form the structure shown in FIG. 7. To achieve this, die-part (1) is supplied with grooves on the side which in FIG. 2 is shown straight, so as to make the orifice for $B_1$ comb-formed like the orifice for B.

In FIG. 8, the film is coextruded of components A, B and $B_1$ in the die 9, which is the die shown in FIGS. 1 and 2. (The heating elements are neither shown here, nor in FIGS. 1 and 2). The film is cooled first by air (not shown) then by the haul-off and cooling roller (10). All rollers shown in FIG. 8 are driven rollers. Hereafter the film is stretched in a first longitudinal stretching process in zone (13) between the set of nip rollers 11–12, which hold against the stretching, and roller 14, which pull in conjunction with the embossed roller 16 and its smooth counter roller 15. Roller 12 is heated to a temperature suitable for the stretching. This process has two objectives. One is partly to orient the filaments (a second longitudinal stretching following after the impression), the other is to bring the filaments closer together. Therefore the length of the stretching zone should be sufficient to allow an almost free contraction of the film, e.g. about 3–4 times the width of the film.

The roller 15 is heated to a temperature suitable for the impression of the film, i.e. to a range where component A is generally solid while B and $B_1$ are semimolten to molten—preferably semimolten—at a temperature in the lower end of their melting range. In order to increase the heat transfer to the film and thereby enable a faster process, roller (14) is also heated, but to a lower temperature where the film has no tendency to stick to the roller. The embossed roller (16) is cooled by water, in order to facilitate the release of the net after the impression.

In order to increase the impression effect and simultaneously split the film to a net structure there is produced a shear by moving the counter roller (15) at a higher circumferential velocity than the embossed roller (16). This is indicated by the longer arrow (17) and the shorter arrow (18). The ratio between these velocities should generally be in the range between 1.25:1 and 2:1. The distance between two adjacent bosses on roller (16) should generally be in the range 1 mm–5 mm.

With reference to the more detailed drawing FIG. 9, the different velocities produce a shear with the effect that the material is pressed against one edge (19) of each tooth (boss) (20), and is forced or pumped into the grooves between the teeth, whereby the stems are formed in (speaking very generally) circular to square form. By sufficient pressure and shearing all contents of B and B₁ can be broken and squeezed away from the areas between the stems, except a thin coat on the filaments of A. In spite of the fact that B and B₁ are disrupted in this manner, the filament of A remain undamaged, when the pressure and shear are suitably adjusted.

As it appears from FIG. 9, the filaments of A are embedded closer to the surface facing the embossed roller than to the other surface. Hereby they are cooled somewhat more than the main portion of the matrix (B and B₁) in which they are embedded. Said cooling also serves to minimize the deformation of the ribbonformed filaments.

As already mentioned, the cooling of the embossed roller facilitates the release of the net. Further for this purpose, the cross-section of each tooth is of trapezoid shape. The hot counter-roller (17) having a smooth surface, the net can usually be released from this surface without special precautions to be taken, however, if a sticky surface component is used in the film, it can be necessary to apply a release agent to this roller.

The product, now in netform, is pulled off from the embossed roller and its counterroller at a very small draw ratio by means of niprollers 24 and 25, and is finally drawn in the longitudinal direction between these niprollers and niprollers 26 and 27. By installing roller 26 very near to roller 25, a lateral contraction of the net is almost prevented, and the straight perpendicular position of the stems is maintained. At (28) the net is fed into a tenter-frame to orient the stems, or, if flat stems are desirable, the net can be calendered at a suitable temperature prior to the cross-stretching.

The net shown in FIG. 10 is taken at the stage between rollers 17–18 and rollers 24–25, where the stems, consisting of B and B₁, are unoriented, and where the longitudinal, ribbon-formed filaments of A have only been oriented in the first step of stretching. In order to show the features of the structure clearer, the filaments of A are spaced considerably apart one another, while in actual fact they should usually lie much closer.

The filaments of A are embedded in the stems, and the latter have thin "branches" (22) which also consist of the matrix material, and also form part of the embedment for the filaments. These branches have the advantageous effect to keep the filaments of A better in position. The branches of matrix material are here shown surrounding the filaments, but depending on the conditions during the impression, they may lie only on one side of each filament. In this case it is advisable to apply small amounts of an adhesive, preferably before the cross-stretching.

The drawing further shows that the filaments are straightened out, although on the embossed roller they were bent into the grooves (see FIG. 8). By this straightening out of the filaments, the stems get an irregular shape at the crosspoints, as shown. This deformation, however, has little or no influence on their strength, as the cross-sectional area of the stems are maintained. It supplies the net with an interesting optical effect, making the illusion of a woven fabric.

When A is incompatible with the matrix materials, the attachment is of a slipping character like in woven structures, thus there is a similar diagonal flexibility and drape effect. Due to these effects which give appearance like woven cloth, the net can be used at the stage before cross-drawing in particular for decoration purposes and the like.

If the matrix is made of an elastomer, no orientation of the stems is possible, and in this case FIG. 10 represents the final stage as far as the stems are concerned. Such net material can e.g. be used in upholstery, where elasticity is an important advantage. Examples of suitable elastomers are block-copolymers consisting of polyurethane or of polystyrene-butadiene, or of polypropylene in which each molecule have both iso- or sydiotactic segments and atactic segments.

The "branches" (22) of matrix material in FIG. 10 form "bridges" frm stem to stem. During the final longitudinal stretching they may break between the stems, but will still have a useful effect in keeping the filaments of A in the right position.

In FIG. 11, the longitudinal stretching has been completed, and the stems have been oriented by cross-drawing of the net in the tenter-frame. The weight can thereby be brought down below 5 gr per sq.m., and the tensile strength in both directions reach values rather close to those of woven cloth of usual filaments of the same components. When the attachment of the filaments to the stems is non-adhesive, i.e. when A and the matrix substance or substances are mutually incompatible, the orientation of both filaments and stems take place without difficulty also at the cross-points.

In this case, the holes in the stems in which the longitudinal filaments are placed, are of course elongated similarly, but the filaments will still be kept in position by means of the branches (22). Due to the stretching in two directions, these branches form a kind of film at the areas adjacent to the stems, as shown.

If instead of splitting the film to a true net during the embossment, there is left a very thin film between the stems, this film will often fibrillate during the cross-stretching and form fine fibres connecting adjacent stems. These fine fibres may often have a suitable decorative effect, as they represent a randomness in the otherwise very regular structure, and they may further serve adhesive purposes, if the net is joined with staple fibres, for example paper fibres, and further they may be advantageous for filtration purposes.

With the exceptions mentioned above, it is usually advantageous to product a strong orientation in both filaments and stems. If the filaments consist of polyamid or polyester, the total longitudinal stretch ratio should preferably be between 3.5:1 and 6:1. If the stems consist of polypropylene or high density polyethylene, the transverse stretch ratio should preferably be between 5:1 and 10:1.

All longitudinal orientation can be carried out before the embossment (impression) but then the spacing between the stems in the final product will be smaller, and it will be difficult to reach the extreme low square meter weights. On the other hand it is also possible to carry out all longitudinal orientation after the impression, but then it is difficult to maintain the rectilineary arrangement of the stems. It is usually advisable to carry out about half of the orientation before and half of it after the impression.

In the above description of the drawings, the filaments are totally embedded in the matrix when the composite film or sheet is formed, and in the resultant net, each filament gors through a hole in each stem. However, it also falls within the scope of the invention to make the embedment partial. The latter may then be supplemented by an adhesive in the final product. While at least some embedment as described, is essential for the product according to the present invention, the method according to the invention can be carried out without any true embedment, but with the ribbonformed longitudinal filaments placed at the surface of surfaces of the "matrix" material. In this case the advantage of the invention is in the conveying action of the filaments during the impression, as described above.

Use is made in the following examples of the line of FIG. 8 with the die of FIGS. 1 and 2. At the exit from the die, the division between the filaments, measured from middle to middle, is 1.2 mm, and the length of the die is 220 mm.

The melt indexes refer to ASTM, conditions specified below.

EXAMPLE 1

Components B and $B_1$ are the same, viz. polypropylene of melt index 5 (condition L).

Component A is Nylon 6, which according to condition K has about the same melt index as B and $B_1$ under similar conditions.

Composition: A 30%, B 20%, $B_1$ 50%.
Weight of extruded film: 100 gr per sq.m.
First longitudinal orientation: draw ratio 2.0:1, lateral contraction ratio 1:1.4.
Shear ratio (=longitudinal contraction) during impression 1:1.4.
Second longitudinal orientation: draw ratio 2.8:11.
Cross stretch ratio: 7:1.
Weight of final net: 5 gr per sq.m.
Pattern on embossed roller: 1 mm wide teeth with 2 mm spacing between the teeth.
Temperature of the film during impression: 155° C.
Temperature during cross-stretching: 130° C.

EXAMPLE 2

Component A as in example 1.
Component $B_1$ polypropylene with high stactic contents (tradename Novolen). Melt index as in example 1.
Component B: an ethylene—acrylic acid copolymer with same melt index as $B_1$.
$B_1$ and B form a strong adhesive bond with each other, partly due to the stactic contents. B is choosen for adhesion to cellulose.
Temperature during impression: 145° C.
Temperature during cross-stretching: 120° C.

EXAMPLE 3

Component A as in example 1.
Component $B_1$ is high density polyethylene with melt index as $B_1$ in example 1.
Component B is a copolymer of 20% vinylacetate and 80% ethylene, melt index like $B_1$.
Temperature during impression: 130° C.
Temperature during cross-stretching: 110° C.

We claim:

1. A net composed of (a) a substantially equispaced parallel array of distinct longitudinal flat ribbon-like continuous filaments of a first polymeric material, and (b) a substantially equispaced parallel array of distinct individual transverse strands of at least one second polymeric material having a melting point lower than said first polymeric material disposed in crossing relation to said longitudinal filaments and defining zones of intersection between the respective filaments and strands of said two arrays, said filaments extending bodily through transverse strands in said zones of intersection with their flat faces generally parallel to the plane of the net so that a section of each longitudinal filament at each such zone is entirely embedded within said second polymeric material, said distinct transverse strands being arranged in said array in a predetermined generally uniform relationship relative to said continuous filaments and to each other with a generally uniform separation between adjacent pairs thereof.

2. An embossed film product in the form of a net composed of (a) a regular array of longitudinal ribbon-like continuous filaments of a first polymer material; and (b) a regular array of transverse strands of a second polymer material different from said first polymer material disposed in crossing relation to said longitudinal filaments and defining zones of intersection between the respective filaments and strands of said two arrays, said filaments extending bodily through said transverse strands in said zones of intersection so that a section of each longitudinal filament at each such zone is entirely embedded within said second polymer material, said second polymer material having a melting point different from the melting point of said first polymer material, said net being formed by impressing a film product and thereafter cross-stretching of said impressed film product.

3. A net according to claim 2 in which the first polymer material forming the filaments has a melting range higher than the second polymer material forming the strands.

4. A net according to claim 2 in which said ribbon-like filaments are tapered at their edges.

5. A net according to claim 2 in which first and second polymer materials are mutually incompatible at their contacting surfaces whereby said filaments are embedded in slipping relation with respect to said strands.

6. A net according to claim 2 in which said first polymer material forming said filaments are oriented.

7. A net according to claim 2 in which said second polymer material forming said strands are oriented.

8. A net according to claim 2 wherein said strands have integral extensions projecting laterally therefrom at each intersecting zone in enveloping relation around adjacent sections of said filaments to lengthen the extent of embeddment of said filaments in said second polymer material.

9. A net according to claim 8 wherein said lateral extensions from adjacent pairs of said strands are generally continuous whereby said filaments are embedded within said second polymer material over substantially the entirety of their length.

10. A net according to claim 2 in which each of said strands if formed of plural layers of different polymer materials.

11. A net according to claim 10 in which at least one surface layer of each such strand is formed of an olefin copolymer adapted to adhesively bond with cellulose, or of an ionomer, while a further layer of such strand is formed of essentially olefin homopolymer.

12. A net according to claim 10 in which said layers are in a state of differential shrinkage forming a curling of the strand.

13. A net according to claim 2 in which said filaments are formed of a polyamide or of polyethyleneterephthalate, and said strands are formed of polyolefin.

14. A net according to claim 2 in which said strands are of generally circular to squared shape.

15. A net according to claim 2 in which said strands are of generally flat ribbon-like shape.

* * * * *

UNITED STATES PATENT AND TRADEMARK OFFICE
CERTIFICATE OF CORRECTION

PATENT NO. : 4,636,419

DATED : January 13, 1987

INVENTOR(S) : Willy B. Madsen et al

It is certified that error appears in the above-identified patent and that said Letters Patent is hereby corrected as shown below:

In the heading, insert the priority data:

--[30] Aug. 11, 1972 [GB] United Kingdom ........ 37499/72

In the heading, [75] Inventors, "Yves R. Russin-Moynier" should read -- Yves R. Roussin-Moynier --;
In the Abstract, line 11, "siad" should read -- said --;
Column 2, line 32, "embodiment" should read -- embedment --;
Column 3, line 10, "the" should read -- The --;
Column 3, line 22, "stiffnes" should read -- stiffness --;
Column 3, line 59, "whch" should read -- which --;
Column 4, line 2, before "advantages" insert -- the --;
Column 10, line 61, "gors" should read -- goes --;
Column 11, line 1, "of" should read -- or --;
Column 11, line 25, "2.8:11" should read -- 2.8:1. --;
Column 11, line 35, "stactic" should read -- atactic --;
Column 11, line 41, "stactic" should read -- atactic --; and
Column 12, claim 10, line 51, "if" should read -- is --.

Signed and Sealed this

Third Day of May, 1988

Attest:

Attesting Officer

DONALD J. QUIGG

Commissioner of Patents and Trademarks